(12) United States Patent
Chen

(10) Patent No.: US 12,495,831 B2
(45) Date of Patent: Dec. 16, 2025

(54) HEATING ATOMIZING CORE AND ELECTRONIC ATOMIZING DEVICE

(71) Applicant: Shenzhen Huachengda Precision Industry Co. Ltd., Guangdong (CN)

(72) Inventor: Ping Chen, Guangdong (CN)

(73) Assignee: SHENZHEN HUACHENGDA PRECISION INDUSTRY CO. LTD., Shenzhen (CN)

( * ) Notice: Subject to any disclaimer, the term of this patent is extended or adjusted under 35 U.S.C. 154(b) by 438 days.

(21) Appl. No.: 17/918,558

(22) PCT Filed: Sep. 24, 2021

(86) PCT No.: PCT/CN2021/120437
§ 371 (c)(1),
(2) Date: Oct. 12, 2022

(87) PCT Pub. No.: WO2023/044793
PCT Pub. Date: Mar. 30, 2023

(65) Prior Publication Data
US 2024/0206539 A1    Jun. 27, 2024

(51) Int. Cl.
*A24F 40/44* (2020.01)
*A24F 40/10* (2020.01)
*A24F 40/46* (2020.01)
*A24F 40/48* (2020.01)
*H05B 3/14* (2006.01)

(52) U.S. Cl.
CPC .............. *A24F 40/44* (2020.01); *A24F 40/10* (2020.01); *A24F 40/46* (2020.01); *A24F 40/48* (2020.01); *H05B 3/141* (2013.01)

(58) Field of Classification Search
None
See application file for complete search history.

(56) References Cited

FOREIGN PATENT DOCUMENTS

| CN | 110897200 A | 3/2020 |
|----|-------------|--------|
| CN | 212520784 U | 2/2021 |
| CN | 112493558 A | 3/2021 |
| CN | 212650387 U | 3/2021 |

(Continued)

OTHER PUBLICATIONS

The office action of CA patent application No. 3176973 issued on May 10, 2024.

(Continued)

*Primary Examiner* — Phu H Nguyen
(74) *Attorney, Agent, or Firm* — Andrew C. Cheng

(57) ABSTRACT

The invention discloses a heating atomizing core and an electronic atomizing device. The heating atomizing core includes an upper cover, a base, and a liquid conducting cotton and a heating member that are sequentially disposed between the upper cover and the base; a cotton pressing member configured to press the liquid conducting cotton is provided on the upper cover or between the upper cover and the liquid conducting cotton, the cotton pressing member at least includes at least one pressing strip abutting against a top surface of the liquid conducting cotton, and an abutting surface of the pressing strip abutting against the liquid conducting cotton forms a plane structure. By providing the cotton pressing member, the liquid conducting cotton is evenly stressed, the liquid conducting gaps in the cotton pressing member are consistent in size, and the liquid conducting cotton has a good liquid locking capacity.

17 Claims, 8 Drawing Sheets

(56) References Cited

FOREIGN PATENT DOCUMENTS

| | | |
|---|---|---|
| CN | 112690500 A | 4/2021 |
| CN | 113197360 A | 8/2021 |
| KR | 20210098117 A | 8/2021 |
| RU | 2728109 C1 | 7/2020 |
| WO | 2020147082 A1 | 7/2020 |

OTHER PUBLICATIONS

The first office action of CN patent application No. 202111124537.5 issued on Mar. 12, 2024.
The first search report of CN patent application No. 202111124537.5 issued on Mar. 12, 2024.
The extended European search report of EP patent application No. 21935434.7 issued on Oct. 11, 2023.
The office action of KR patent application No. 10-2022-7040033 issued on May 24, 2024.
The office action of RU patent application No. 2022130169/03(066114) issued on Aug. 15, 2023.

HEATING ATOMIZING CORE AND ELECTRONIC ATOMIZING DEVICE

FIELD

The present invention relates to the field of atomization technology, and more specifically, to a heating atomizing core and an electronic atomizing device.

BACKGROUND

The electric heating atomizing technology is a novel atomizing technology emerging in recent years, and is now widely used in medical, intelligent household appliances, and consumer electronics products. The principle is that heat energy is generated through the thermal effect of resistance, then the heat energy heats and atomizes the liquid into atomized vapor. The atomizing assembly currently used in the electronic cigarette industry is mainly divided into soft liquid conducting material such as liquid conducting cotton and hard liquid conducting material such as porous ceramics according to its liquid conducting medium. Wherein, the liquid conducting cotton has, soft liquid conducting material, high porosity, good liquid conducting performance, and high flavor reduction degree, and thus is widely used in the atomization industry.

However, the current electronic atomizing device with the liquid conducting cotton has the following defects: when the liquid conducting cotton has a large area, the peripheral portion is compressed tightly by force, while the middle portion is not compressed by force, which will result in smaller liquid conducting gaps in the compressed peripheral portion, and larger gaps in the uncompressed middle portion, thereby causing inconsistent liquid conducting gaps in each portion of the liquid conducting cotton; too large gaps will reduce the liquid locking capacity of the liquid conducting cotton, and the atomized liquid is easy to leak and drip under the influence of its own gravity; when the liquid conducting cotton atomizing core is used with a planar heating member, the gaps in the liquid conducting cotton will be different due to different pressure conditions of each portion during use due to its softness and the flexibility, which will lead to oil leakage, and a high temperature of the heating member, and a core burning during continuous use.

SUMMARY

A technical problem to be solved by the present invention is, in view of the foregoing defect in the prior art, to provide a heating atomizing core and an electronic atomizing device, with a consistent liquid conducting gap in each portion of a liquid conducting cotton, so that the liquid conducting cotton has a good liquid locking capacity, thereby avoiding the leakage and dripping of the atomized liquid caused by the large gap of the liquid conducting cotton, and not prone to a core burning, which optimizes the atomization effect and improves the atomization flavor.

A technical solution adopted by the present invention to solve the technical problem is to provide a heating atomizing core, including an upper cover, a base, and a liquid conducting cotton and a heating member that are sequentially disposed between the upper cover and the base; wherein a cotton pressing member configured to press the liquid conducting cotton is provided on the upper cover or between the upper cover and the liquid conducting cotton, the cotton pressing member at least includes at least one pressing strip abutting against a top surface of the liquid conducting cotton, and an abutting surface of the pressing strip abutting against the liquid conducting cotton forms a plane structure, the base is provided with an air inlet hole, and the cotton pressing member is provided with a liquid inlet passage communicated with a liquid inlet.

Further, in the heating atomizing core, preferably, the pressing strip passes by a center or near a center of the top surface of the liquid conducting cotton.

Further, in the heating atomizing core, preferably, the cotton pressing member and the upper cover are detachably connected or fixedly connected, or the cotton pressing member and the upper cover are in an integrated structure; or the cotton pressing member is an independent structure.

Further, in the heating atomizing core, preferably, the cotton pressing member is a flat structure, or the cotton pressing member is a three-dimensional structure.

Further, in the heating atomizing core, preferably, the pressing strip is at least one of a horizontal pressing strip, a vertical pressing strip, or an oblique pressing strip.

Further, in the heating atomizing core, preferably, a frame is provided around the pressing strip, and the frame is connected with the pressing strip to form an integration that abuts against the liquid conducting cotton.

Further, in the heating atomizing core, preferably, each arrangement of the horizontal pressing strip, the vertical pressing strip, and the oblique pressing strip is in a straight line, a curve, or their combination.

Further, in the heating atomizing core, preferably, a cross section of the pressing strip is polygonal, curved, or their combination.

Further, in the heating atomizing core, preferably, a shape of the abutting surface of the cotton pressing member is adapted to a shape of the top surface of the liquid conducting cotton.

Further, in the heating atomizing core, preferably, a porous ceramic member is provided between the liquid conducting cotton and the heating member, and a bottom surface of the porous ceramic member fits to the heating member.

Further, in the heating atomizing core, preferably, a shape of a top surface of the porous ceramic member is adapted to a shape of a bottom surface of the liquid conducting cotton; or/and a shape of the bottom surface of the porous ceramic member is adapted to a shape of a heating track of the heating member to achieve a close fit therebetween.

Further, in the heating atomizing core, preferably, the porous ceramic member is provided with at least one of a liquid conducting hole, a liquid conducting groove and a liquid conducting cavity, for accelerating liquid transmission.

Further, in the heating atomizing core, preferably, a top of the porous ceramic member is provided with a concave-convex portion, and a bottom of the liquid conducting cotton is connected with the concave-convex portion in an embedded connection.

Further, in the heating atomizing core, preferably, the concave-convex portion includes at least one groove or/and at least one protrusion disposed on a top surface of the porous ceramic member.

Further, in the heating atomizing core, preferably, the liquid conducting cotton is provided with at least one of a liquid storage hole, a liquid storage tank and a liquid storage cavity, configured for storing a liquid.

An electronic atomizing device, including an atomizing shell, the heating atomizing core of the above, and a liquid storage chamber between the atomizing shell and the heating atomizing core.

The present invention provides the following beneficial effects: the heating atomizing core provided in the present invention includes an upper cover, a base, and a liquid conducting cotton and a heating member that are sequentially disposed between the upper cover and the base, a cotton pressing member configured to press the liquid conducting cotton is provided on the upper cover or between the upper cover and the liquid conducting cotton, the cotton pressing member at least includes at least one pressing strip abutting against a top surface of the liquid conducting cotton, and an abutting surface of the pressing strip abutting against the liquid conducting cotton forms a plane structure; by providing the cotton pressing member, the pressing strip can press the liquid conducting cotton, since the abutting surface of the pressing strip forms the plane structure, the liquid inlet surface of the liquid conducting cotton also forms a plane structure when being compressed, so that the deformation of the liquid conducting cotton caused by uneven stress is avoided, the liquid conducting cotton is evenly stressed, the liquid conducting gaps in the cotton pressing member are consistent in size, and the liquid conducting cotton has a good liquid locking capacity, thereby avoiding the leakage and dripping of the atomized liquid caused by the enlarged liquid conducting gap of the liquid guide cotton, not easy to occur a core burning, optimizing the atomization effect and improving the atomization flavor.

BRIEF DESCRIPTION OF THE DRAWINGS

Subject matter of the present invention will be described in even greater detail below based on the exemplary figures. In the accompanying drawings.

DETAILED DESCRIPTION

Figure 1:
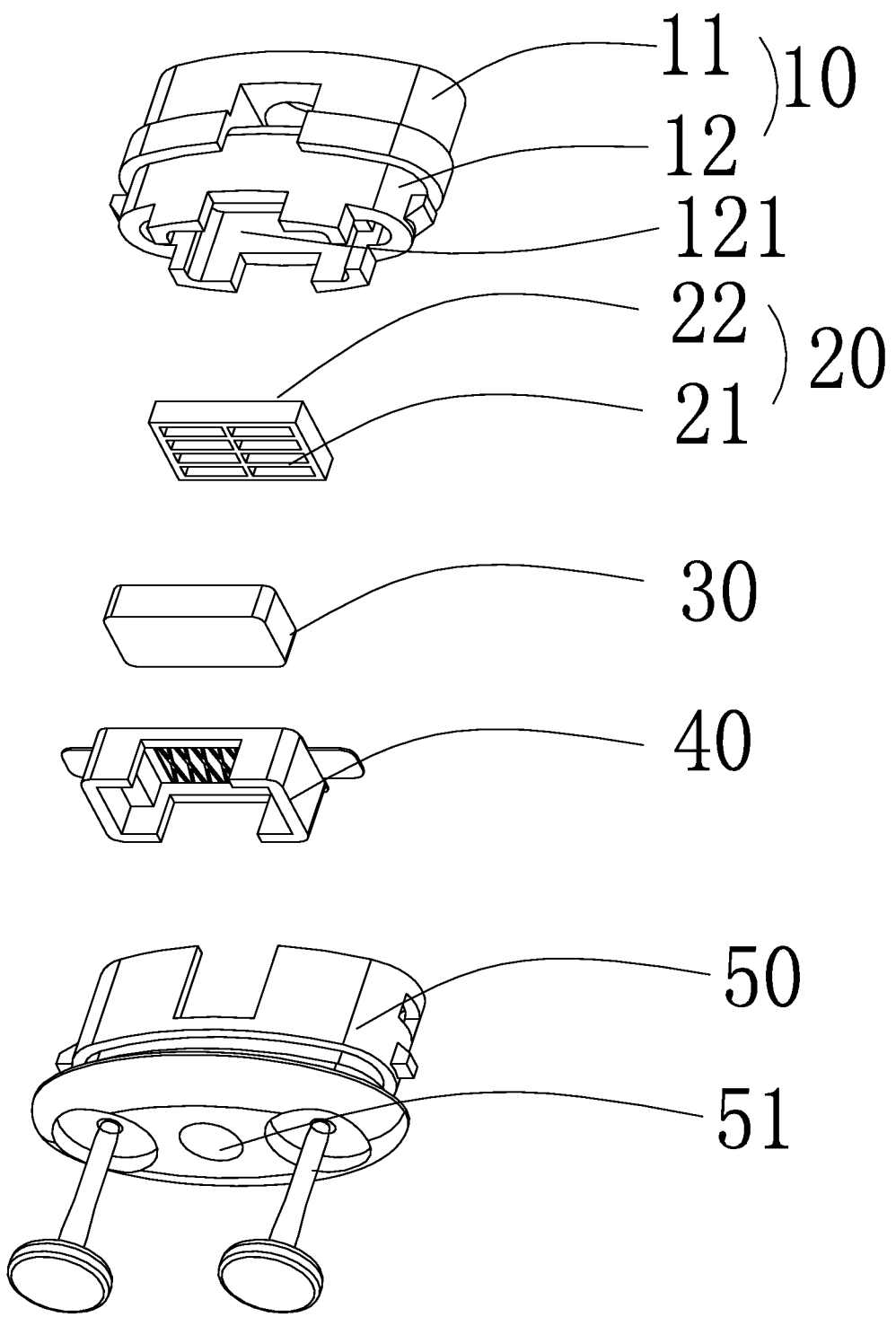
FIG. 1 is an exploded view of a heating atomizing core in Embodiment 1 of the present invention.
Figure 2:
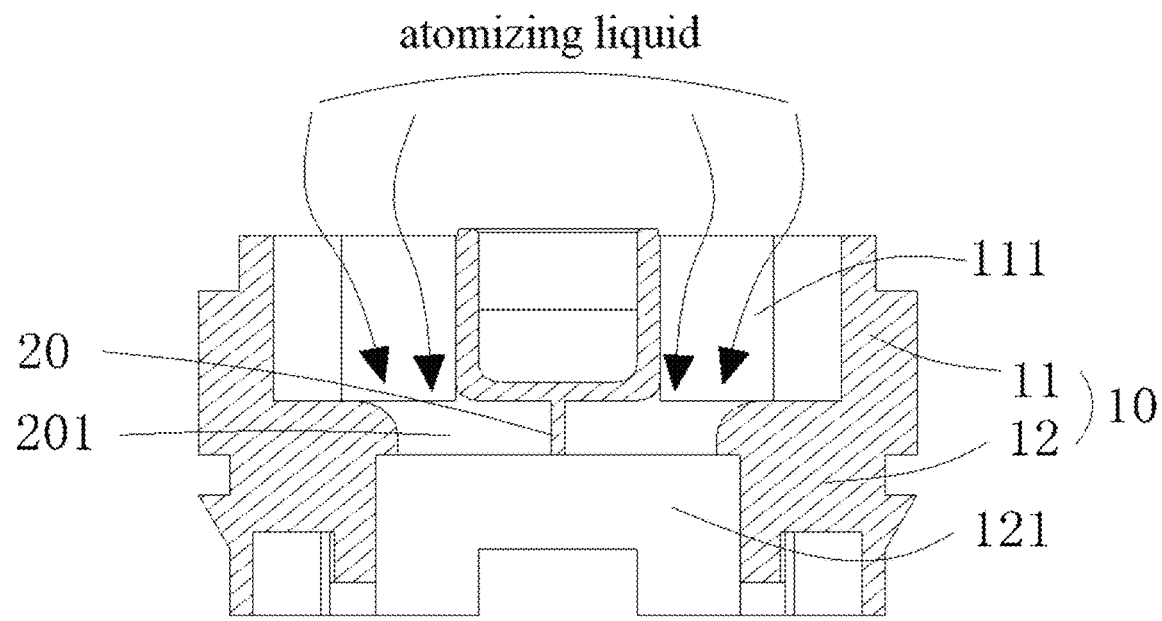
FIG. 2 is a sectional view showing the cooperation between the upper cover and the cotton pressing member in the heating atomizing core in Embodiment 1 of the present invention.

In order to more clearly illustrate the present invention, the technical solutions in the embodiments of the present invention will be described in even greater detail below with reference to the accompanying drawings.

It should be noted that, in the present invention, when a component is described to be "fixed to" or "disposed on" another component, it may be directly or indirectly located on another component. When a component is described to be "connected to" another component, it may be directly or indirectly connected to another component.

The orientation or the position relationship indicated by relative terms such as "upper", "lower", "left", "right", "front", "back", "vertical", "horizontal", "top", "bottom", "inner", "outer" should be construed to refer to the orientation or the position relationship as then described or as illustrated in the drawings under discussion. These relative terms are for convenience of description and cannot be understood as limitation to the technical solution. The terms "first", "second" and the like are only used for the convenience of describing the technical solution, and cannot be understood as indicating or implying the relative importance or implicitly indicating the number of the indicated technical features. The term "a plurality of" or "multiple" means two or more, unless otherwise specified.

In the present invention, the horizontal direction refers to the direction of the connecting line between the two liquid inlets of the upper cover, and the vertical direction refers to the direction perpendicular to the connecting line between the two liquid inlets.

Embodiment 1: as shown in FIGS. 1 to 21, a heating atomizing core, including an upper cover 10 and a base 50; a liquid conducting cotton 30 and a heating member 40 are disposed sequentially between the upper cover 10 and the base 50; a cotton pressing member 20 configured to press the liquid conducting cotton 30 is provided on the upper cover 10 or between the upper cover 10 and the liquid conducting cotton 30; the cotton pressing member 20 at least includes at least one pressing strip 21 abutting against a top surface of the liquid conducting cotton 30, the abutting surface of the pressing strip 21 abutting against the liquid conducting cotton 30 forms a plane structure. In the present invention, the base 50 is provided with an air inlet hole 51, and the cotton pressing member 20 is provided with a liquid inlet passage 201 communicated with a liquid inlet 111. By providing the cotton pressing member 20 provided with the pressing strip 21, the pressing strip 21 can press the liquid conducting cotton 30, and the abutting surface of the pressing strip 21 forms a plane structure. The description that the abutting surface of the pressing strip 21 forms a plane structure in the present invention refers to: the bottom surface of the pressing strip 21 is on a planar surface, or the bottom surfaces of a plurality of pressing strips 21 are on a planar surface. The pressing of the pressing strip 21 enables the liquid inlet surface, i.e. the top surface, of the liquid conducting cotton 30 to form a plane structure, and avoids the deformation of the liquid conducting cotton 30 caused by uneven stress due to only suppressed on its peripheries, so that the liquid conducting cotton 30 is uniformly stressed, the sizes of the liquid conducting gaps are consistent, and the liquid conducting cotton 30 has a good liquid locking capacity, thereby avoiding the leakage and dripping of the atomized liquid caused by the enlarged liquid conducting gap of the liquid guide cotton 30, not easy to occur a core burning, optimizing the atomization effect and improving the atomization flavor. When the heating atomizing core works, the atomizing liquid enters a liquid inlet passage communicated with the liquid inlet from the upper cover 10, the air enters an air inlet hole 51 of the base 50, the atomizing liquid enters the liquid conducting cotton 30 through the cotton pressing member 20, and the heating member 40 generates heat to atomize the atomizing liquid in the liquid conducting cotton 30 to generate atomized vapor, then the atomized vapor is mixed with the incoming air to form aerosol, which is eventually inhaled by a user.

The upper cover 10 and the base 50 are cooperated, and are mainly used to receive the liquid conducting cotton 30 and the heating member 40, wherein the external forms thereof may not be limited. The upper cover 10 includes a cover body 11 and a receiving portion 12 that may receive the liquid conducting cotton 30. The receiving portion 12 is provided with an inner cavity 121 configured to accommodate the liquid conducting cotton 30 and the heating member 40 in cooperation with the base 50. The cotton pressing member 20 is arranged on the cover body 11 or in the inner cavity 121 of the receiving portion 12 and adjacent to the cover body 11, that is, the cotton pressing member 20 and the upper cover 10 may be separate structures, and may be modeled separately during production, making the modeling easier. In this structure, the cotton pressing member 20 is constrained by the upper cover 10 or pressed on the liquid conducting cotton 30 by the upper cover 10. The shape of the cotton pressing member 20 is adapted to the shape of the inner cavity 121 of the receiving portion 12 of the upper cover 10 or/and the shape of the top of the liquid conducting cotton 30. The cotton pressing member 20 is placed in the inner cavity 121 of the receiving portion 12, and located between the cover body 11 and the top of the liquid conducting cotton 30. The upper cover 10 and the base 50 are closely matched and connected into a whole by insertion-fit or snap-fit.

Further, the cotton pressing member 20 and the upper cover 10 may be connected together, through detachable connection or fixed connection. Wherein, the detachable connection is that, the cover body 11 of the upper cover 10 is a frame structure, and the cotton pressing member is screwed, snapped, pinned or tightly fitted into the cover 11. The fixed connection may be that the cotton pressing member 20 is fixed on a wall surface of the cover 11. Furthermore, the cotton pressing member 20 and the upper cover 10 may also be an integrated structure, and the cotton pressing member 20 is located in the inner cavity of the receiving portion 12, this structure does not need to be modeled multiple times during production, and only needs to be modeled once, and the assembly step is omitted.

Figure 3:
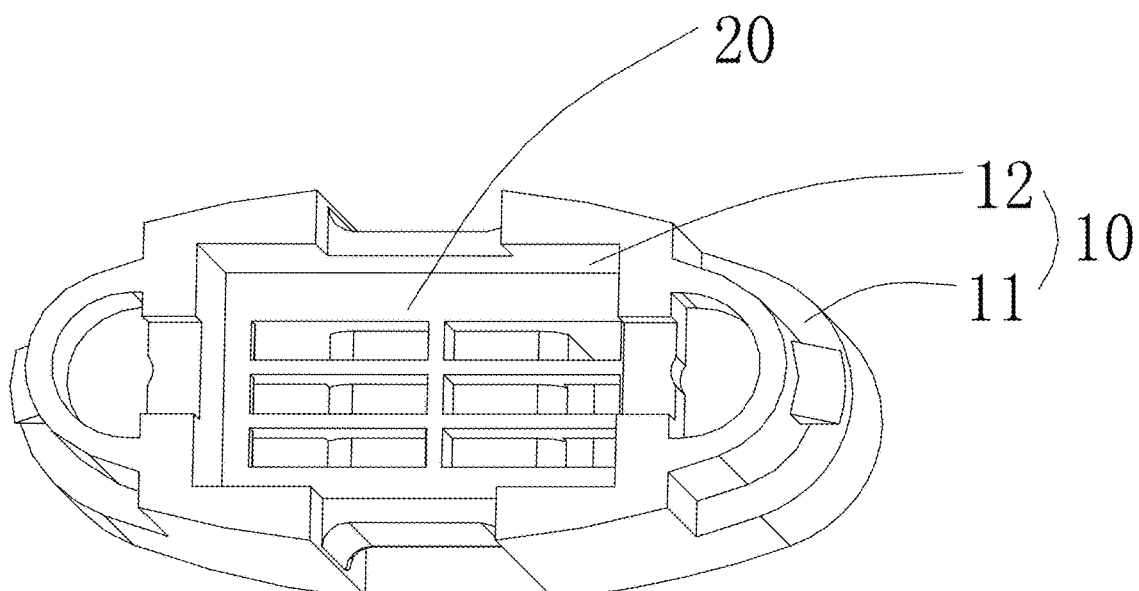
FIG. 3 is a structural diagram of the upper cover and the cotton pressing member in the heating atomizing core in Embodiment 1 of the present invention.

There are many ways to implement the configuration of the cotton pressing member 20: the cotton pressing member 20 may be a relatively thin flat structure, and made of metal with certain strength; alternatively, as shown in FIG. 3, the cotton pressing member 20 may be a three-dimensional structure with a certain thickness and a certain strength, and the fabrication material is not specifically limited.

The cotton pressing member 20 mainly includes the pressing strip 21. The number of the pressing strip 21 may be one or multiple, when being one, the one pressing strip 21 preferably passes by the center or near the center of the top surface of the liquid conducting cotton 30; when being multiple, at least one of the pressing strips 21 preferably passes by the center or near the center of the top surface of the liquid conducting cotton 30. In this way, the periphery and the center of the top surface of the liquid conducting cotton 30 can be pressed. When one pressing strip is provided, the width of the one pressing strip may be selected larger, or a branch may be provided at any position of the pressing strip 21 extending outward to expand the area of the abutting surface of the pressing strip 21, and preferably, two ends of the pressing strip 21 are provided with branches.

Similarly, when multiple pressing strips 21 are provided, the pressing strip 21 may also be provided with the branch. However, the cotton pressing member 20 or the pressing strip 21 shall not cover the full top surface of the liquid conducting cotton 30 or block the liquid inlet 111, and the cotton pressing member 20 needs to be provided with a liquid inlet passage 201 communicated with the liquid inlet 111. In order to achieve a better pressing, preferably, multiple pressing strips 21 are provided, which may be evenly distributed on the top surface of the liquid conducting cotton 30 to evenly press the liquid conducting cotton 30.

Figure 10:
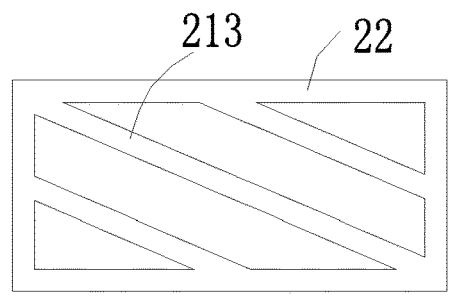
Figure 11:
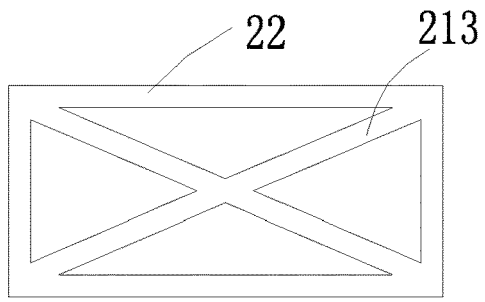
Figure 12:
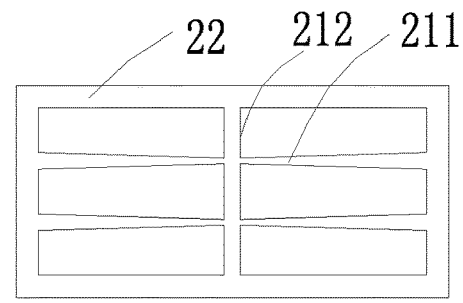

The shape of the pressing strip 21 has various embodiments: the cross sections of the pressing strips 21 are polygonal, curved or their combination, that is, the shapes of the pressing strip 21 may be a cuboid, a cylinder, a polyhedron, or a combination of the cylinder and the cuboid, or a combination of the cylinder and the polyhedron, or the combination of the cuboid and the polyhedron, and the shapes of the pressing strips 21 are not limited. As shown in FIGS. 4 to 11, the pressing strips 21 may have a same diameter or a same width, and are equal-diameter pressing strips. As shown in FIG. 12, the pressing strips 21 may have different diameter or widths, and are variable-diameter pressing strips, wherein the variable diameters may be at any position, and may be gradually increased or decreased, or may be arbitrarily variable, which is not limited in the present invention.

The extending direction of the pressing strip 21 has various implementations: as shown in FIG. 4 to FIG. 17, the pressing strips 21 may include at least one of a horizontal pressing strip 211, a vertical pressing strip 212, or an oblique pressing strip 213. The upper cover 10 is provided with at least one liquid inlet 111 for the entry of the atomized liquid, and the liquid inlet 111 passes through the top surface of the upper cover 10 and communicates with the inner cavity 121 of the receiving portion 12. Preferably, two liquid inlets 111 are correspondingly provided on two sides of the upper cover 10. The atomized liquid enters from the liquid inlets 111 on the two sides of the upper cover 10 into the top surface of the liquid conducting cotton 30, and the atomized liquid entering the inner cavity 121 gathers to the middle in the horizontal direction, therefore, the extending direction of the pressing strip 21 affects the flow rate of the atomized liquid, and the horizontal pressing strip 211 and the oblique pressing strip 213 can enable the atomized liquid to reach each position of the liquid conducting cotton 30 smoothly in the horizontal direction, and the vertical pressing strip 212 can slow down the flow rate of the atomized liquid in the length direction. Therefore, preferably, the horizontal pressing strip 211 and the oblique pressing strip 213 are mostly provided. The purpose of the pressing strip 21 is to press the liquid conducting cotton 30 to form a plane structure, that is, to enable the liquid inlet surface (top surface) of the liquid conducting cotton 30 to form a plane structure, so that the gap differences between the portions of the liquid conducting cotton 30 is small when being compressed, and no large difference in tightness exists, so that the liquid conducting cotton 30 has a good consistency in liquid conducting.

The horizontal pressing strip 211, the vertical pressing strip 212, and the oblique pressing strip 213 may be provided independently or in any combination. For example, the horizontal pressing strip 211 and the vertical pressing strip 212 are combined provided, or the vertical pressing strip 212 and the oblique pressing strip 213 are combined provided, or the horizontal pressing strip 211 and the oblique pressing strip 213 are combined provided, or the horizontal pressing strip 211, the vertical pressing strip 212 and the oblique pressing strip 213 are combined provided.

The arrangement of the pressing strip 21 has various implementations. As shown in FIG. 4 to FIG. 17, each arrangement of the horizontal pressing strip 211, the vertical pressing strip 212, and the oblique pressing strips 213 may be in a straight line, a curve, or their combination, and multiple pressing strips 21 are arranged in regular order, symmetrically, or randomly. Wherein, the curve refers to any curve structure, such as arc, parabola, helix, or the like, and the combination may be a combination of multiple straight lines to form a broken line structure or a straight line branch structure or the like, or may be a combination of a curve and a curve to form a wavy structure or a curved branch structure or the like, or may be a combination of a straight line and a curve, and the specific arrangement of the pressing strips 21 is not limited. In a specific embodiment, the cotton pressing member 20 includes a vertical pressing strip 212 and a horizontal pressing strip 211, the pressing strips 21 press the liquid conducting cotton 30 disposed below, so that the full large area of the liquid conducting cotton 30 is divided into four equal areas, in this way, all portions of the liquid conducting cotton 30 are compressed more uniformly, so that the liquid conducting gaps in the liquid conducting cotton 30 are consistent, and the liquid conducting cotton 30 has a good liquid locking capacity.

Figure 4:
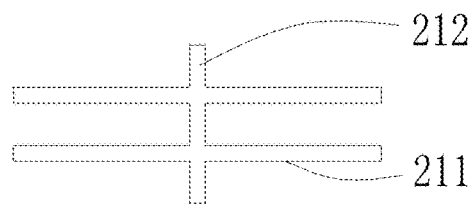
FIG. 4 to FIG. 17 are the structural diagrams of different embodiments of the cotton pressing member in the heating atomizing core in Embodiment 1 of the present invention.
Figure 5:
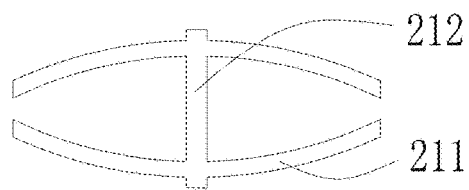
Figure 6:
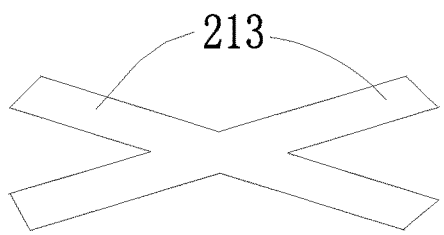

The pressing strip 21 is the basic structure of the cotton pressing member 20 of the present invention. On the basis of the above structure, a frame 22 may be arranged around the pressing strip 21, and the shape and the position of the frame 22 are adapted to the shape of the top surface of the liquid conducting cotton 30. As shown in FIG. 4 to FIG. 6, the cotton pressing member 20 only includes the pressing strips 21 abutting against the liquid conducting cotton 30. As shown in FIG. 7 to FIG. 15, the cotton pressing member 20 includes the pressing strips 21 and the frame 22 disposed around the pressing strips 21, and the frame 22 and the pressing strips 21 are connected to form an integration that abuts against the liquid conducting cotton 30.

As shown in FIG. 4, the cotton pressing member 20 includes two horizontal pressing strips 211 that are straight-line shaped and a vertical pressing strip 212, and the vertical pressing strip 212 corresponds to the center of the top surface of the liquid conducting cotton 30. As shown in FIG. 5, the cotton pressing member 20 includes two horizontal pressing strips 211 that are curved and a vertical pressing strip 212 that is straight-line shaped, and the straight-line shaped vertical pressing strip 212 corresponds to the center of the top surface of the liquid conducting cotton 30. As shown in FIG. 6, the cotton pressing member 20 includes two oblique pressing strips 213 that are straight-line shaped, and the two oblique pressing strips 213 are intersected to each other, and the intersection of the straight-line shaped oblique pressing strips 213 corresponds to the center of the top surface of the liquid conducting cotton 30.

Figure 7:
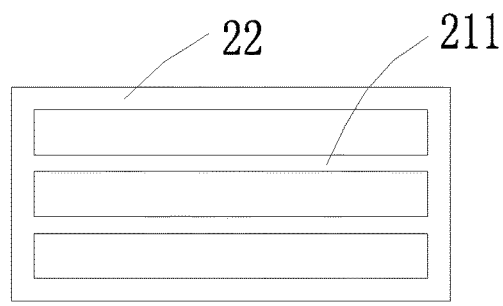
Figure 8:
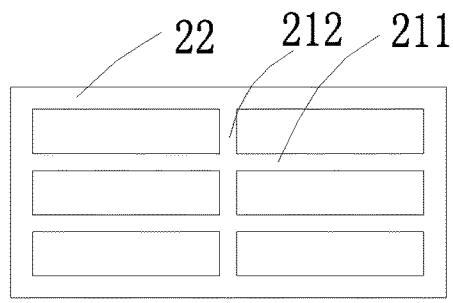
Figure 9:
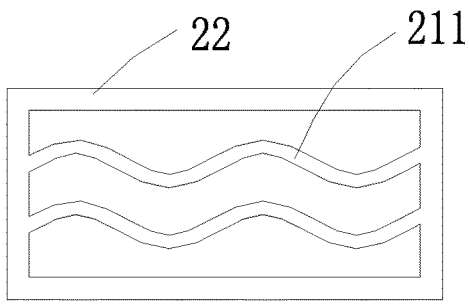
Figure 13:
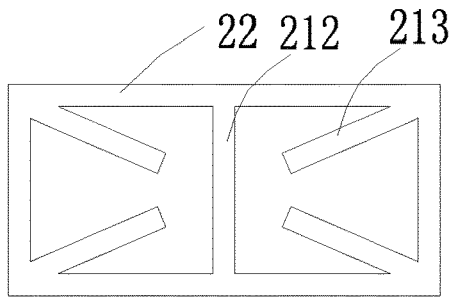
Figure 14:
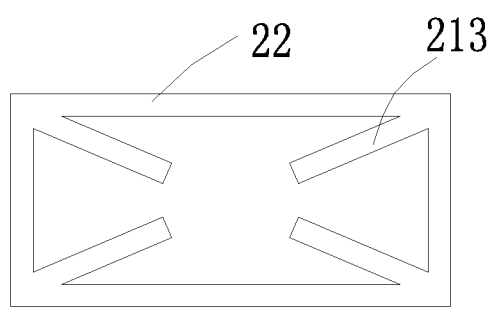
Figure 15:
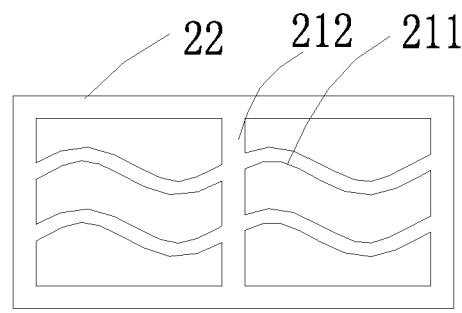
Figure 16:
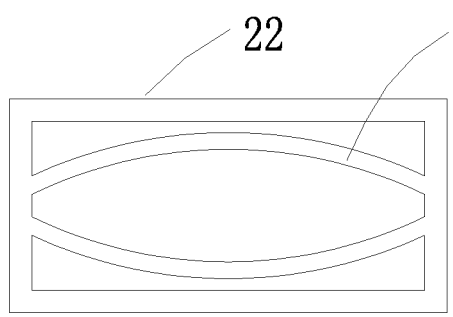
Figure 17:
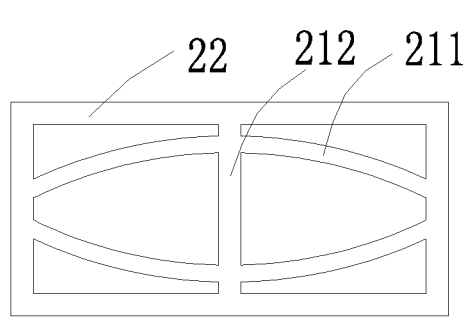
Figure 18:
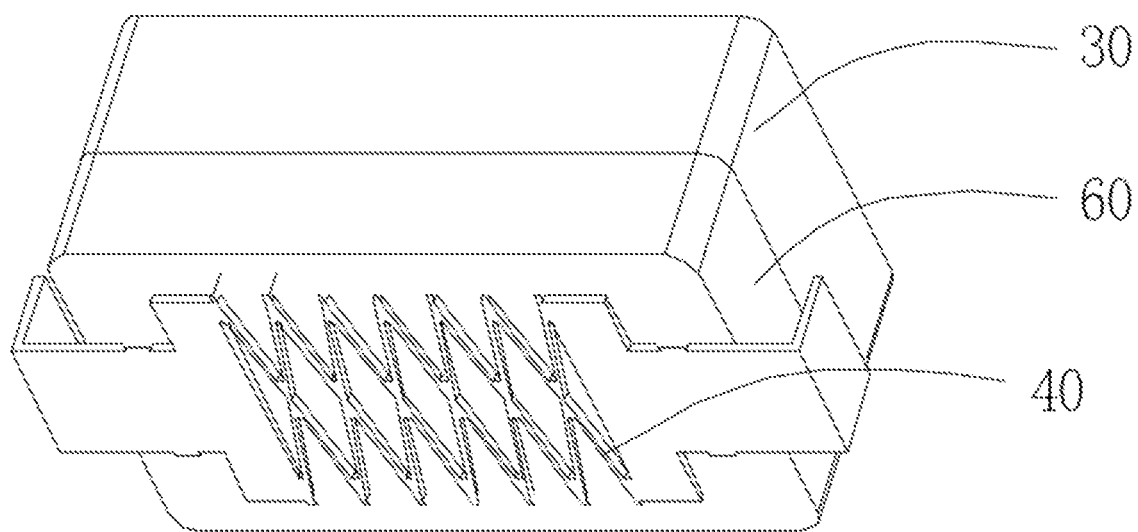
FIG. 18 is a three-dimensional structural diagram of a first embodiment of the position relationship between the cotton pressing member, the porous ceramic member and the heating member in Embodiment 1 of the present invention.

As shown in FIG. 7, the cotton pressing member 20 includes two horizontal pressing strips 211 that are straight-line shaped and a frame 22, and the two straight-line shaped horizontal pressing strips 211 correspond to the center of the top surface of the liquid conducting cotton 30. As shown in FIG. 8, the cotton pressing member 20 further includes a frame 22 on the basis of FIG. 4. As shown in FIG. 9, the two horizontal pressing strips 211 of the cotton pressing member 20 are changed to the curve shape from the straight-line shape in FIG. 7. As shown in FIG. 10, the cotton pressing member 20 includes three oblique pressing strips 213 that are straight-line shaped and a frame 22, and the straight-line shaped oblique pressing strip 213 that is located in the middle corresponds to the center of the top surface of the liquid conducting cotton 30. As shown in FIG. 11, the cotton pressing member 20 further includes a frame 22 on the basis of FIG. 6. As shown in FIG. 12, the two straight-line shaped horizontal pressing strips 211 of the cotton pressing member 20 are changed from the equal diameters in FIG. 8 to non-equal diameters, and the diameters of the horizontal pressing strip 211 gradually decreases toward the center. As shown in FIG. 13, the cotton pressing member 20 includes four oblique pressing strips 213 that are straight-line shaped, a vertical pressing strip 212 and a frame 22, one end of the oblique pressing strips 213 is respectively connected to the four corners of the frame, and another end thereof extends to near the center of the top surface of the liquid conducting cotton 30; the vertical pressing strip 212 passes by the center of the top surface of the liquid conducting cotton 30. As shown in FIG. 14, the cotton pressing member 20 includes four oblique pressing strips 213 that are straight-line shaped and a frame 22, one end of the oblique pressing strips 213 is respectively connected to the four corners of the frame, and another end thereof extends to near the center of the top surface of the liquid conducting cotton 30. As shown in FIG. 15, the cotton pressing member 20 further includes a vertical pressing strip 212 on the basis of FIG. 9, and the vertical pressing strip 212 passes by the center of the top surface of the liquid conducting cotton 30 correspondingly. As shown in FIG. 16, the cotton pressing member 20 includes a frame 22 and two curved horizontal pressing strips 211. As shown in FIG. 17, the cotton pressing member 20 further includes a vertical pressing strip 212 on the basis of FIG. 16, and the vertical pressing strip 212 passes by the center of the top surface of the liquid conducting cotton 30 correspondingly.

As shown in FIG. 18 to FIG. 21, on the basis of the above-mentioned heating atomizing core, a porous ceramic member 60 may further be provided between the liquid conducting cotton 30 and the heating member 40, and the bottom surface of the porous ceramic member 60 fits to the heating member 40. The liquid inlet end of the heating atomizing core adopts the liquid conducting cotton 30, which is softer and has a high porosity and a good liquid conductivity, as the liquid conducting medium, and the portion of the heating atomizing core that is in contact with the heating member 40 adopts the porous ceramic member 60 as the liquid conducting medium. The liquid inlet end adopts the liquid conducting cotton 30 to improve the efficiency of liquid conducting and liquid locking, so that the liquid conducting cotton 30 can fill the gap between the components to lock the oil and prevent leakage when the oil supply of the heating atomizing core is sufficient. Since the liquid conducting cotton 30 is soft, and thus can fill the gap between the porous ceramic member 60 and other component of the heating atomizing core, thereby to effectively seal the gap and prevent the liquid from leaking through the gap, so that the silica gel and the process of silica gel assembly may be omitted. The porous ceramic member 60 is a hard liquid conducting member with a high temperature resistance and a solid form, and may be used as a carrier of the heating member 40 with a low strength, which is equivalent to that the entire flat surface of the porous ceramic member 60 presses on the liquid conducting cotton 30, so that the liquid conducting cotton 30 is uniformly compressed, the liquid conducting is more uniform, and the liquid conducting efficiency is optimized, in addition, the heating member 40 is attached to the bottom surface of the porous ceramic member 60, so that the heating member 40 and the liquid conducting member are in good contact, the heating member 40 is not easy to be deformed, and the porous ceramic member 60 is resistant to high temperature without carbonization, and the service life is greatly prolonged.

The heating member 40 is generally made of stainless steel, nickel chromium, iron chromium aluminum, nickel iron or other alloy with high resistivity, and may have a thickness of 0.03 mm to 0.2 mm, and the specific thickness is not limited. The heating member 40 may be embedded on the bottom surface of the porous ceramic member 60 by using a heating track formed by a metal sheet through corrosion cutting process, or may be a heating track printed on the bottom surface of the porous ceramic member 60 through thick film printing. The porous ceramic member 60 is a thin sheet structure, with a thickness, for example, between 0.1 mm and 2 mm. The purpose of designing thinner is to prevent the porous mesh structure in the porous ceramic member 60 from blocking the passability of macromolecules in the tobacco oil, and only make use of the porous ceramic member 60 being good in strength and resistant to high temperature, not easy to be carbonized, and capable to support and fix the heating member 40, to avoid a bad contact with the heating member 40.

The shape of the top surface of the porous ceramic member 60 is adapted to the shape of the bottom surface of the liquid conducting cotton 30, which makes the bottom surface of the liquid conducting cotton 30 to be in a more close contact with the porous ceramic member 60, so that the gap differences between the portions of the liquid conducting cotton 30 is small when being compressed, and no large difference in tightness exists, so that the consistency in liquid conducting of the liquid conducting cotton 30 to the porous ceramic member 60 is better. The shape of the bottom surface of the porous ceramic member 60 is matched with the shape of the heating track of the heating member 40 to achieve a close fit therebetween, and avoid a bad contact between the porous ceramic member 60 and the heating member 40, so that the heat generated by the heating track of the heating member 40 can be used to heat the atomized liquid in the porous ceramic member 60 to the maximum extent, the atomization effect is optimized and the atomization flavor is improved.

Figure 21:
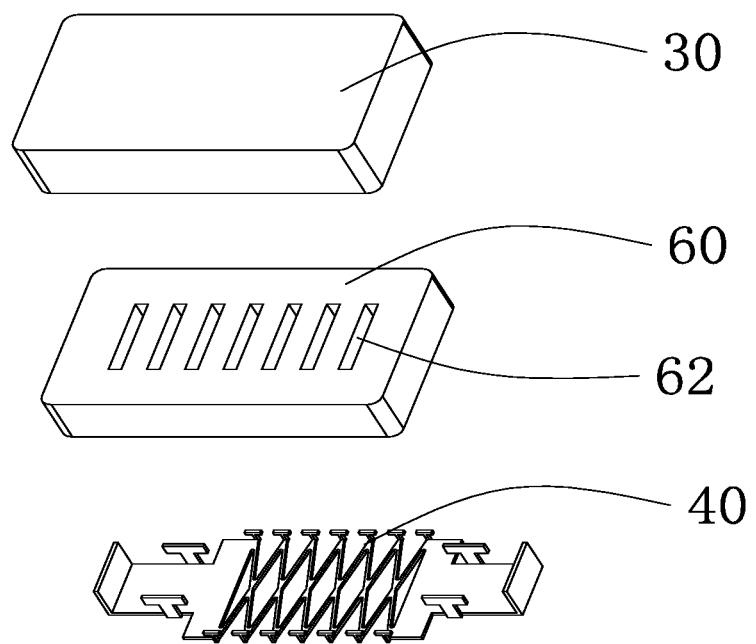
FIG. 21 is an exploded view of a third embodiment of the position relationship between the cotton pressing member, the porous ceramic member and the heating member in Embodiment 1 of the present invention.

The porous ceramic member 60 is provided with at least one of a liquid conducting hole, a liquid conducting groove 62 and a liquid conducting cavity, for accelerating liquid transmission. The arrangement of the liquid conducting hole, the liquid conducting groove 62 or the liquid conducting cavity accelerates the transmission of the atomized liquid, reduces the transmission path of the liquid in the porous ceramic member 60, and can improve the passability of some macromolecules in the tobacco oil. As shown in FIG. 21, the liquid conducting groove 62 is adopted in this embodiment.

Figure 19:
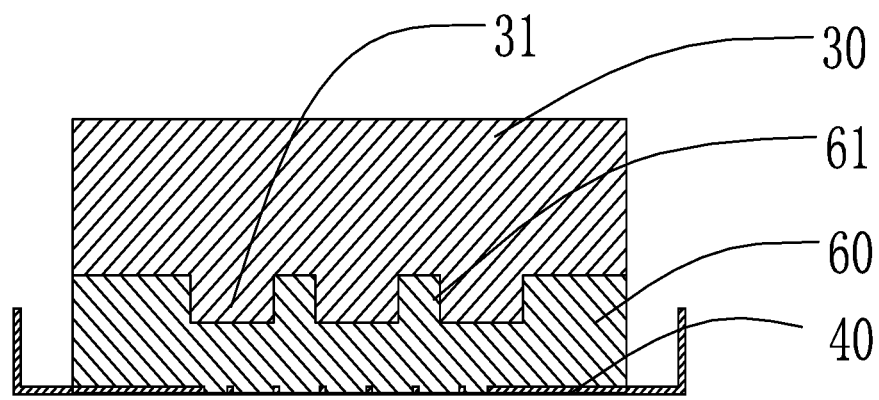
FIG. 19 is a sectional view of the position relationship between the cotton pressing member, the porous ceramic member and the heating member in Embodiment 1 of the present invention.

As shown in FIG. 19, a concave-convex portion 61 is provided on the top of the porous ceramic member 60, and the bottom of the liquid conducting cotton 30 and the concave-convex portion 61 are connected in an embedded connection. Herein, the embedded connection refers to: the liquid conducting cotton 30 is directly embedded in the concave-convex portion 61, or alternatively, the bottom of the liquid conducting cotton 30 is also provided with a concave-convex structure 31 which is matched with the concave-convex portion 61, that is, the two are matched in a concave-convex way. Specifically, the concave-convex portion 61 includes at least one groove or/and at least one protrusion arranged on the top surface of the porous ceramic member 60, the bottom of the liquid conducting cotton 30 is provided with the concave-convex structure 31, and the concave-convex structure 31 of the liquid conducting cotton 30 is embedded with the protrusion or the groove on the top surface of the porous ceramic member 60, which can increase the contact area between the liquid conducting cotton 30 and the porous ceramic member 60, and is beneficial to optimize the liquid conducting effect. In addition, the thicknesses of the liquid conducting cotton 30 and the porous ceramic member 60 may be adjusted according to actual needs to achieve the desired liquid conducting effect.

Figure 20:
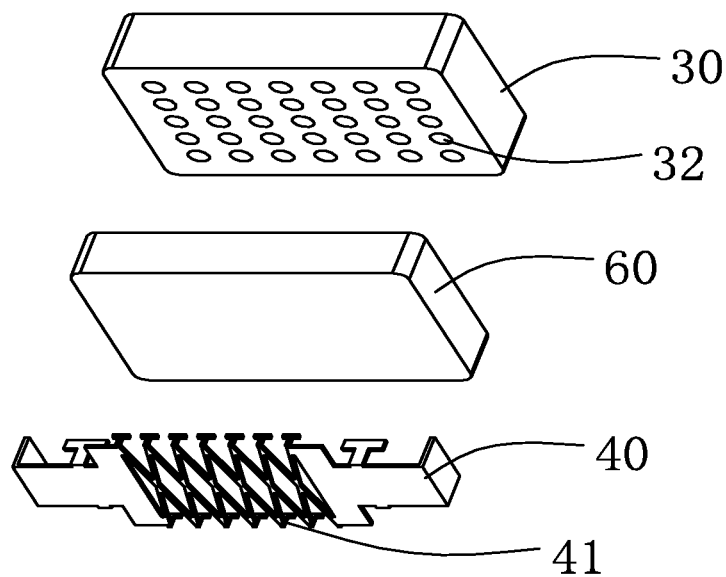
FIG. 20 is an exploded view of a second embodiment of the position relationship between the cotton pressing member, the porous ceramic member and the heating member in Embodiment 1 of the present invention.

As shown in FIG. 20, preferably, the liquid conducting cotton 30 is further provided with at least one of a liquid storage hole 32, a liquid storage tank and a liquid storage cavity, configured for storing the liquid. Wherein, the liquid storage hole 32 is a through hole passing through the top and bottom of the liquid conducting cotton 30, the liquid storage tank is a tank opened at the top of the liquid conducting cotton 30, and the liquid storage cavity is a relatively closed cavity disposed inside the liquid conducting cotton 30. The above structure can make the liquid conducting cotton 30 have more liquid storage space therein, to store more atomized liquid to be supplied to the porous ceramic member 60 below for rapid absorption, so as to ensure that the supply of the atomized liquid is sufficient during continuous operation. In the embodiment, the liquid storage hole 32 is adopted.

Figure 22:
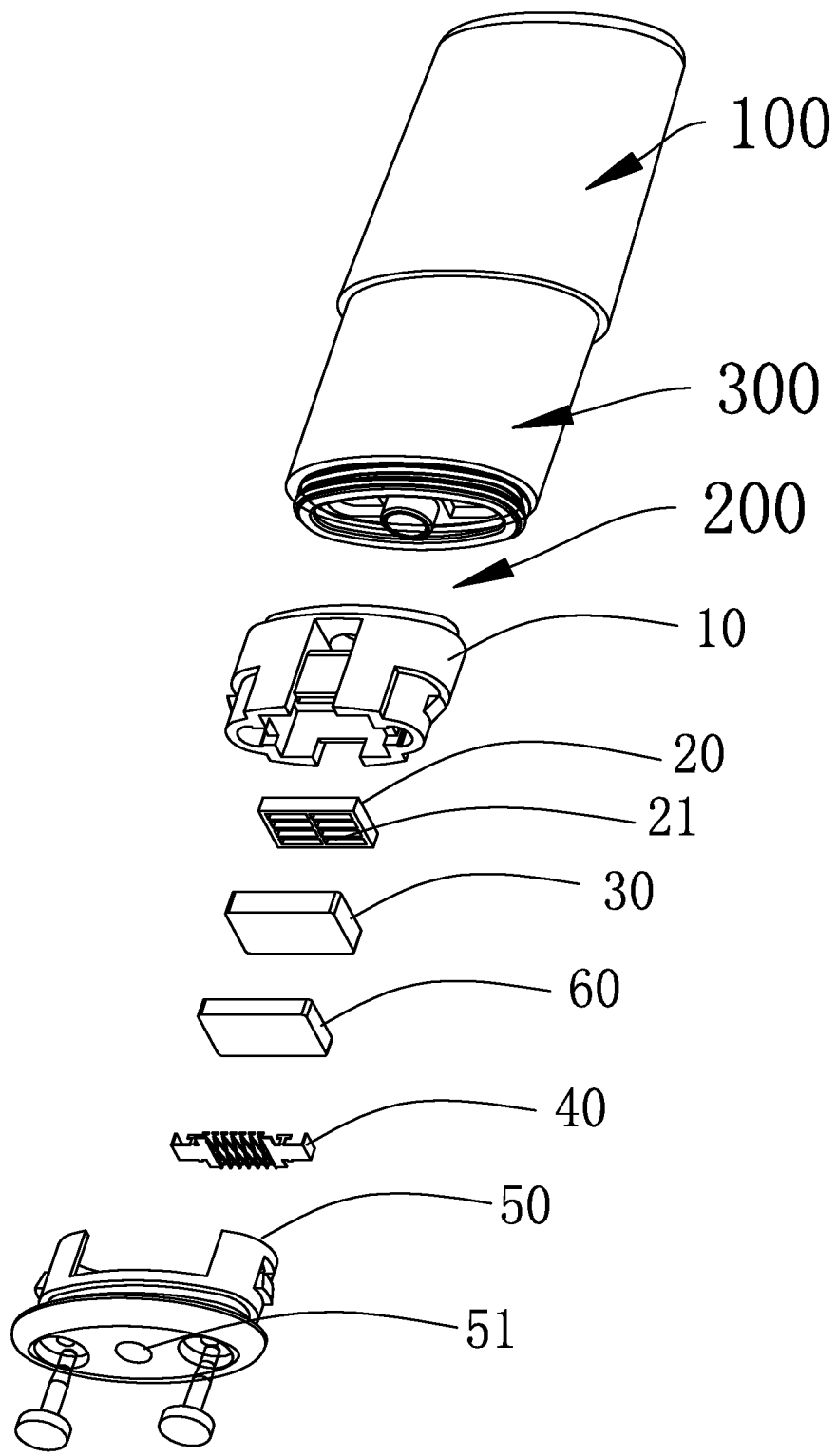
FIG. 22 is an exploded view of an electronic atomizing device in Embodiment 2 of the present invention.
Figure 23:
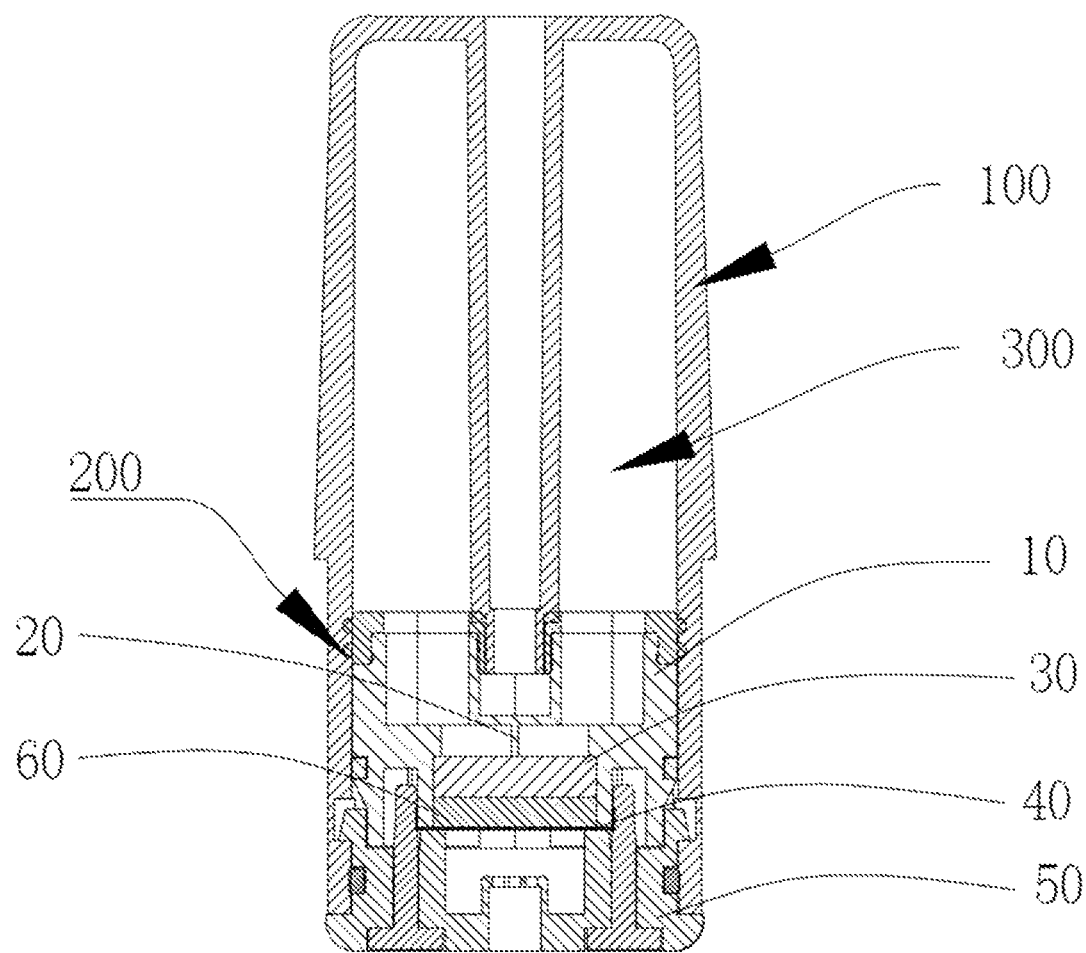
FIG. 23 is a sectional view of the electronic atomizing device in Embodiment 2 of the present invention.

Embodiment 2: as shown in FIG. 22 to FIG. 23, an electronic atomizing device, including the atomizing shell 100, in which the heating atomizing core 200 in Embodiment 1 is provided, and a liquid storage chamber 300 is provided between the atomizing shell 100 and the heating atomizing core 200. When the electronic atomizing device works, the liquid storage chamber 300 stores the atomized liquid and supplies the liquid to the heating atomizing core 200, the air enters the atomizing shell 100 and flows by the heating atomizing core 200, and the heating atomizing core 200 atomizes the atomized liquid to generate atomized vapor, then the air is mixed with the atomized vapor to form aerosol, which flows out of the atomizing shell 100 to be finally inhaled by the user.

Other structures of the electronic atomizing device may adopt the prior art, and will not be repeated herein.

What is claimed is:

1. A heating atomizing core, comprising:
    an upper cover (10);
    a base (50); and
    a liquid conducting cotton (30) and a heating member (40) that are sequentially disposed between the upper cover (10) and the base (50);
    wherein a cotton pressing member (20) configured to press the liquid conducting cotton (30) is provided on the upper cover (10) or between the upper cover (10) and the liquid conducting cotton (30),
    wherein the cotton pressing member (20) at least comprises at least one pressing strip (21) abutting against a top surface of the liquid conducting cotton (30), and an abutting surface of the pressing strip (21) abutting against the liquid conducting cotton (30) forms a plane structure,
    a porous ceramic member (60) is provided between the liquid conducting cotton (30) and the heating member (40), and a bottom surface of the porous ceramic member (60) fits to the heating member (40);
    a top of the porous ceramic member (60) is provided with a concave-convex portion (61), a bottom of the liquid conducting cotton (30) is connected with the concave-convex portion (61) in an embedded connection; and the bottom of the liquid conducting cotton (30) is also provided with a concave-convex structure (31) which is matched with the concave-convex portion (61);

wherein the base (50) is provided with an air inlet hole (51), and wherein the cotton pressing member (20) is provided with a liquid inlet passage communicated with a liquid inlet.

2. The heating atomizing core of claim 1, wherein the pressing strip (21) passes by a center or near a center of the top surface of the liquid conducting cotton (30) and extends to a periphery of the liquid conducting cotton (30).

3. The heating atomizing core of claim 1, wherein the cotton pressing member (20) and the upper cover (10) are detachably connected or fixedly connected, or the cotton pressing member (20) and the upper cover (10) are in an integrated structure; or the cotton pressing member (20) is an independent structure.

4. The heating atomizing core of claim 1, wherein the cotton pressing member (20) is a flat structure, or the cotton pressing member (20) is a three-dimensional structure.

5. The heating atomizing core of claim 1, wherein the pressing strip (21) is at least one of a horizontal pressing strip (211), a vertical pressing strip (212), or an oblique pressing strip (213).

6. The heating atomizing core of claim 1, wherein a frame (22) is provided around the pressing strip (21), and the frame is connected with the pressing strip (21) to form an integration that abuts against the liquid conducting cotton (30).

7. The heating atomizing core of claim 5, wherein each arrangement of the horizontal pressing strip (211), the vertical pressing strip (212), and the oblique pressing strip (213) is in a straight line, a curve, or their combination.

8. The heating atomizing core of claim 1, wherein a cross section of the pressing strip (21) is polygonal, curved, or their combination.

9. The heating atomizing core of claim 1, wherein a shape of the abutting surface of the cotton pressing member (20) is adapted to a shape of the top surface of the liquid conducting cotton (30).

10. The heating atomizing core of claim 1, wherein a shape of a top surface of the porous ceramic member (60) is adapted to a shape of a bottom surface of the liquid conducting cotton (30); or/and a shape of a bottom surface of the porous ceramic member (60) is adapted to a shape of a heating track of the heating member (40) to achieve a close fit therebetween.

11. The heating atomizing core of claim 1, wherein the porous ceramic member (60) is provided with at least one of a liquid conducting hole, a liquid conducting groove and a liquid conducting cavity, for accelerating liquid transmission.

12. The heating atomizing core of claim 1, wherein the concave-convex portion (61) includes at least one groove or/and at least one protrusion disposed on a top surface of the porous ceramic member (60).

13. The heating atomizing core of claim 1, wherein the liquid conducting cotton (30) is provided with at least one of a liquid storage hole, a liquid storage tank and a liquid storage cavity, configured for storing a liquid.

14. An electronic atomizing device, comprising:
an atomizing shell (100);
the heating atomizing core (200) of claim 1; and
a liquid storage chamber (300) between the atomizing shell (100) and the heating atomizing core (200).

15. The electronic atomizing device of claim 14, wherein the pressing strip (21) passes by a center or near a center of the top surface of the liquid conducting cotton (30) and extends to a periphery of the liquid conducting cotton (30).

16. The electronic atomizing device of claim 14, wherein a frame (22) is provided around the pressing strip (21), and the frame is connected with the pressing strip (21) to form an integration that abuts against the liquid conducting cotton (30).

17. The electronic atomizing device of claim 14, wherein a porous ceramic member (60) is provided between the liquid conducting cotton (30) and the heating member (40), and a bottom surface of the porous ceramic member (60) fits to the heating member (40).

\* \* \* \* \*